Nov. 16, 1965 G. DE BOER 3,217,411
INSTALLATION FOR PERIODICALLY FILLING CHEESE MOULDS
Filed June 25, 1964 2 Sheets-Sheet 1

INVENTOR.
GEERT DE BOER

Nov. 16, 1965                G. DE BOER                3,217,411
INSTALLATION FOR PERIODICALLY FILLING CHEESE MOULDS
Filed June 25, 1964                          2 Sheets-Sheet 2

INVENTOR.
GEERT DE BOER
BY

United States Patent Office 3,217,411
Patented Nov. 16, 1965

3,217,411
INSTALLATION FOR PERIODICALLY FILLING
CHEESE MOULDS
Geert de Boer, Lippenhuizen, Netherlands, assignor to
N.V. Volma, Gorredijk, Netherlands
Filed June 25, 1964, Ser. No. 377,875
Claims priority, application Netherlands, June 28, 1963,
294,730
5 Claims. (Cl. 31—46)

My invention relates to an installation for periodically filling cheese moulds with a measured piece of curd in a non liquid condition, the said installation comprising a number of sieve tubes, which on their upper side are connected with a whey and curd feeder and on their lower side cooperate with a table, in which is provided at least one aperture, the sieve tubes being relatively movable in respect of the table, the installation furthermore comprising a feeding and discharging device for one or more cheese moulds, each cheese mould being periodically situated under the aperture in the table. Such an installation is known in various embodiments, either the sieve tubes moving and the table being stationary or vice versa. The cheese mould may either be fed and discharged continuously or stepwise in dependence on the relative movement of the sieve tubes in respect of the table.

A problem with the known installation which has not been solved in a satisfactory way for all occurring circumstances consists in that when the piece of curd is sinking into the cheese mould, air inclusions are produced by suction either in the piece of curd itself or in the column of whey which is on top thereof. This suction of air is among other things dependent on the (non adjustable) velocity at which the piece of curd sinks into the cheese mould.

It is an object of my invention to provide an installation in which air inclusions and air suction in the curd is prevented in the best possible way.

It is a further object of my invention to determine the velocity of the downward movement of each piece of curd in such manner that the whey and curd column is not broken and that there is adequate time for gradually replenishing the column with fresh material supplied by the whey and curd feeder, the fed quantity corresponding to the quantity of curd which sinks from the sieve tube at the lower end thereof.

My invention also aims at accommodating the driving mechanism entirely under the cheese mould conveyor, so that the various essential elements which are provided under the sieve tubes do not interfere with each other.

My invention will hereinafter be clarified with reference to the accompanying drawing in which an embodiment of the installation according to the invention is represented.

Figure 1:
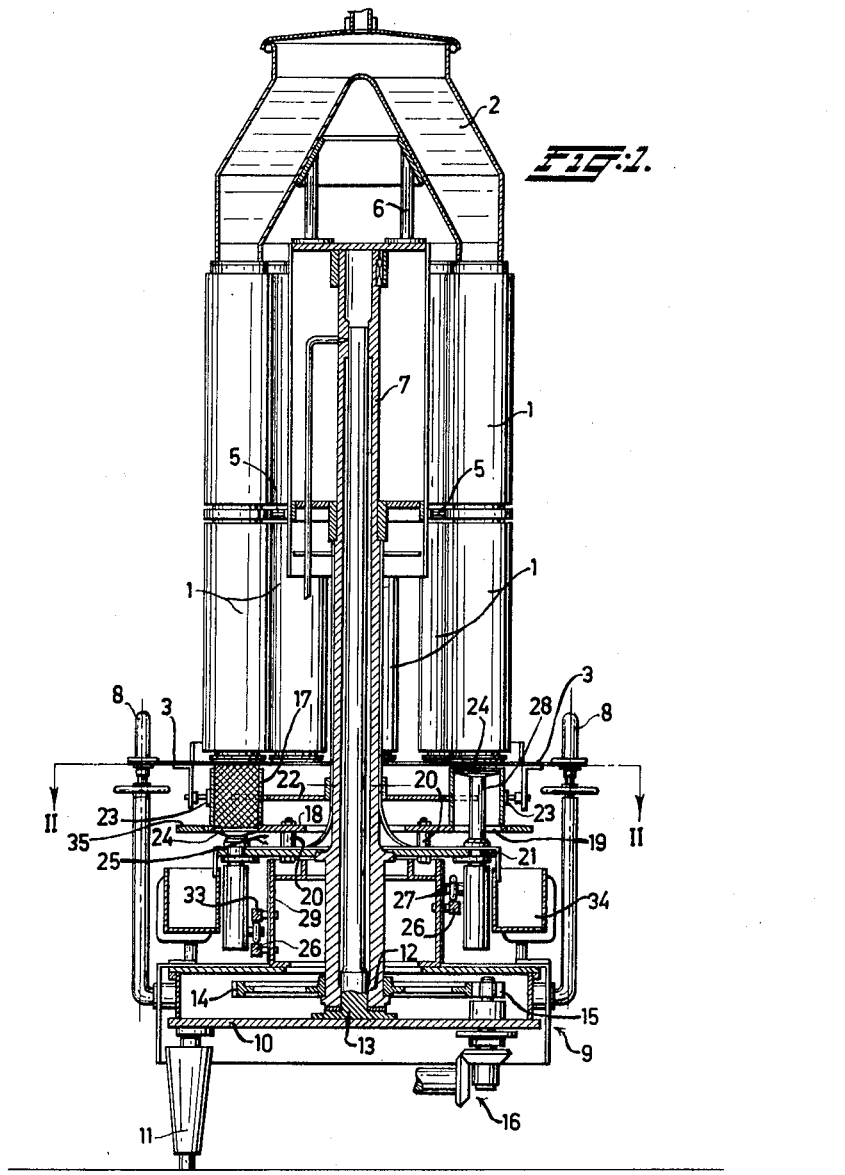
FIGURE 1 is a vertical longitudinal section through the installation according to the line I—I in FIG. 2.
Figure 2:
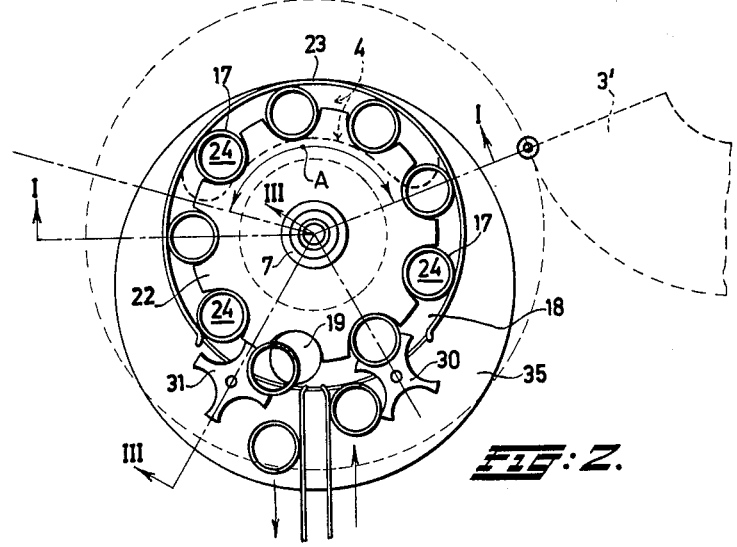
FIGURE 2 is a section according to the line II—II in FIG. 1, the various elements visible in this figure being represented in outline.

As is seen in FIG. 1 the installation consists of a number (in this case nine) sieve tubes 1, which at their upper end are connected with a whey and curd feeder 2 and which at their lower end cooperate with a stationary table 3. This table is provided with an ablong aperture 4 (see FIG. 2) which is situated with in the operative path A as indicated in FIGURE 2. The sieve tubes 1 are arranged in a closed circular configuration and together with the feeder 2 secured by way of some supporting members 5 and 6 to a central rotatable shaft 7.

The stationary table 3 is connected with the base 9 of the device, the said base consisting of a box shaped frame 10 with three legs 11, which are adjustable as to height. The central shaft 7 is supported by its lower end 12 on a bearing 13 within the frame 10. Secured to the lower end 12 is a gear wheel 14 which engages a pinion 15, the latter forming a part of an only partially represented driving gear 16. Under the table 3 are a number of cheese moulds 17, each consisting of a cylindrical casing, which are bearing on a supporting ring 18 in which are provided holes 19. This supporting ring serves as a feeding and discharging table for the cheese moulds 17 and is secured to the central shaft 7 by way of elements 20 and a suspension plate 21. The position of the cheese moulds 17 over each hole 19 (the number of which is equal to the number of sieve tubes 1 which are provided in the device) is exactly determined by means of a star wheel 22 and a guide strip 23. This strip is connected with the stationary part of the device and is situated in the operative track A (see FIG. 2) and also slightly outside thereof.

A supporting surface 24 secured to a bearing element 25 fits in each of the holes 19 of the supporting ring 18. Each bearing element is supported in the suspension plate 21 and therefore moves together with the supporting ring 18 and the cheese moulds 17 disposed thereon. The bearing element 25 is provided with means for moving up and down each supporting surface 24, consisting of a stationary cam profile 26 along which a roller 27 is movable, which roller by way of a rod 28 supports the supporting surface 24 concerned. The cam profile 26 is secured to a casing 29 which is integral with the base 9, the frame 10, resp. of the device.

Figure 3:
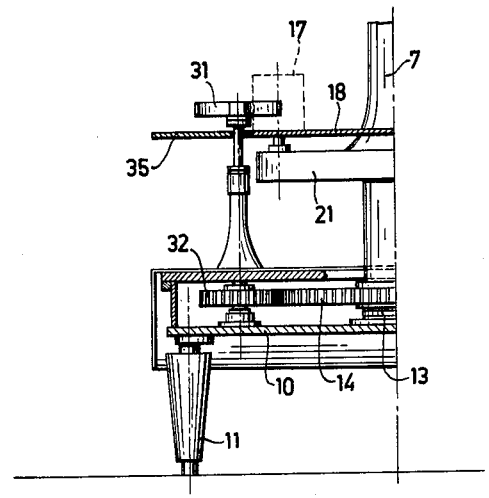
FIGURE 3 is a vertical longitudinal section through the feeding and discharging device, respectively according to the line III—III in FIG. 2.

As is seen in FIG. 2 empty cheese moulds 17 are fed by way of a digrammatically represented star wheel 30, the filled cheese moulds being also discharged by means of a digrammatically represented star wheel 31. The driving means of the star wheels 30 and 31 are represented in detail in FIG. 3 and consist of a gear wheel 32 which is in mesh with the gear wheel 14. The latter driving means are thus synchronized with the main driving gear of the sieve tubes 1. Provided in the plane of the supporting ring 18 with holes 19 is a stationary plate 35, which extends around the circumference of the said ring, the empty cheese moulds 17 being fed thereon on the one hand and the filled moulds discharged thereon on the other hand (see FIG. 2).

The installation operates as follows: quantity of whey and curd is supplied in the space 2 and sinks into the entirely or partially perforated sieve tubes 1. The lower end of the open sieve tubes is initially closed by the surface of the table 3, the aperture 4 of which, during the starting period, is for instance closed by a swinging piece 3′, indicated in FIGURE 2. The drive for the central shaft 7 and the driving means 30 and 31 are actuated so that the sieve tubes 1 advance over the table 3, the empty moulds 17 being moved forward underneath this table. After the aperture 4 is opened the first arriving sieve tube, which reaches this aperture (depicted at the right of FIG. 1) will no longer be closed at its lower end, so that the pieces of curd herein start sinking. In this phase, however, there is a supporting surface 24 under the sieve tube which receives the sinking curd column. During the continued rotation and within the operative track A this supporting surface will gradually move downwardly within the cheese mould 17, due to the cam profile 26 so that the mould is gradually filled in this way. At the end of the operative track the supporting surface 24 is at the level of the supporting ring 18. At that moment the sieve tube 1 concerned reaches the end of the oblong aperture 4, whereupon the curd column is cut through by the edge of this aperture and the situation as depicted at the left of FIG. 1 arises. For the sake of safety a pressure strip 33 is provided over the cam profile 26, the said strip being parallel to the profile 26 in the area of the track A, so that each roller 27 is forced to ride on the profile 26 within the said track.

The guiding strip 23, which in cooperation with the star wheel 22 ensures, that the cheese moulds 17 are located in position over the hole 19 concerned, ends in this phase (see FIGURE 2) whereupon the filled cheese mould by way of the star wheel 31 can be discharged toward a conveyor (not represented). Hereupon the star wheel 30 moves an empty cheese mould 17 into the vacant place after which the cycle for the sieve tube 1 concerned is repeated. In operation the nine sieve tubes 1 perform the cycle described hereinbefore simultaneously, their phase, however, being staggered.

The whey dripping down in the installation and which cannot be discharged in another way is received in an annular gully 34 and carried off.

So far the above described cheese moulds 17, are cylindrical without a bottom or a cover. Properly speaking these cheese moulds consist merely of a supporting tube for the measured pieces of curd. These cheese moulds may therefore also be applied as an intermediate mould from which every pre-formed piece of curd is either manually or mechanically pressed into the final cheese mould, for instance in case hard cheese like Edam or Gouda cheese should be made. For various other types of cheese cylindrical or generally hollow tubes can also serve as a final mould.

It will be understood that this invention is susceptible to modification in order to adapt it to different usages and conditions and, accordingly, it is desired to comprehend such modifications within this invention as may fall within the scope of the appended claims.

What I claim is:

1. An installation for periodically filling cheese moulds with a measured piece of curd in a nonliquid condition, the said installation comprising a number of sieve tubes, which on their upper side are connected with a whey and curd feeder and on their lower side cooperate with a table in which is provided at least one aperture, the sieve tubes being relatively movable with respect to the table, the installation further comprising a feeding and discharging device below said table and sieve tubes for one or more cheese moulds, each cheese mould being periodically situated under the aperture in the table, each cheese mould consisting of a hollow tubular casing, at least one flat supporting surface being provided with an outer perimeter, which fits in the mould, means being present cooperating with said supporting surface for moving same up and down over a distance which substantially corresponds with the height of the cheese mould.

2. An installation according to claim 1, in which the sieve tubes are arranged in a closed configuration, the said sieve tubes being capable of travel along a path in this configuration, the table being stationary and a conveyor for the cheese moulds being provided below the table, said conveyor, at least in its portion situated under the aperture in the stationary table, being provided with a hole, which has the same shape as the cross sectional area of the interior of the cheese mould, the flat supporting surface in its lowermost position filling this hole.

3. An installation according to claim 2, in which the aperture in the stationary table, as measured in the direction of movement of the sieve tubes, is larger than the width of a sieve tube, means being provided for synchronously moving the cheese mould conveyor and the sieve tubes, said conveyor being provided with a flat supporting ring, the shape of which corresponds with the configuration of the sieve tubes, in which supporting ring is provided a hole under each sieve tube, a supporting surface fitting in each hole, the means for moving up and down the supporting surfaces only being operative in a limited track of the path of the cheese mould conveyor, the said track corresponding to and being situated under said aperture in the stationary table.

4. An installation according to claim 3, the means for moving up and down each supporting surface consisting of a bearing member secured under each supporting surface, the said member cooperating with a cam profile, which is provided at least in the limited track under the aperture in the stationary table.

5. An installation according to claim 4, in which the sieve tubes are arranged in a circular configuration and are moved in a circular path by means of a central rotatable shaft, upon which a star wheel, the supporting ring and a suspension plate for the bearing members of the supporting surfaces are secured, the cam profile under the suspension plate being stationary.

References Cited by the Examiner

UNITED STATES PATENTS 3,098,297 7/1963 De Boer _____ 31—44
3,142,904 8/1964 De Boer _____ 31—13

SAMUEL KOREN, Primary Examiner.

ALDRICH F. MEDBERY, Examiner.